Sept. 20, 1927.
G. H. GILMAN
TOOL STEEL RETAINING DEVICE
Filed Dec. 31, 1919
1,642,948
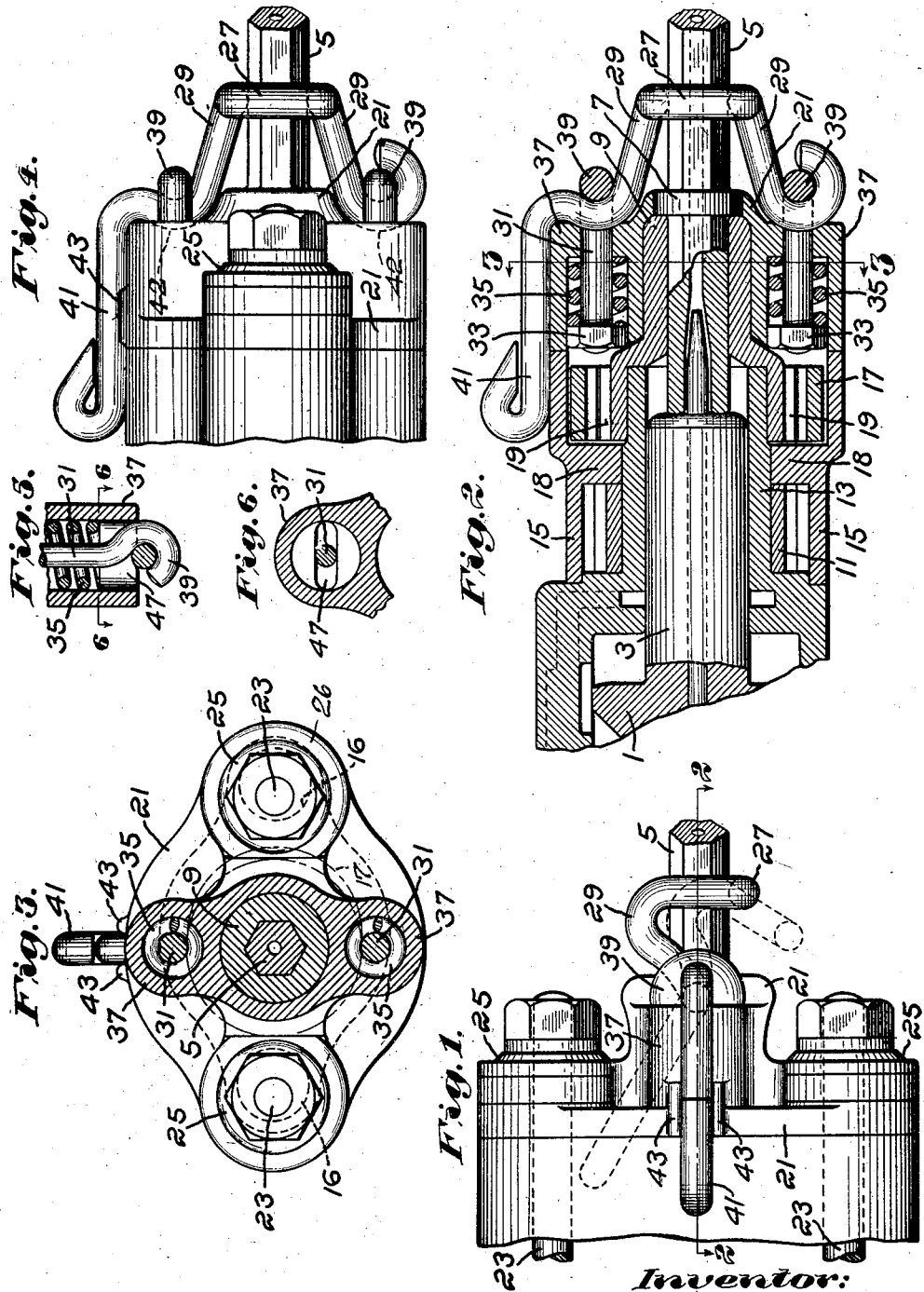
Inventor:
George H. Gilman,
by Emery Booth Janney Varney
Attys.

Patented Sept. 20, 1927.

1,642,948

UNITED STATES PATENT OFFICE.

GEORGE H. GILMAN, OF CLAREMONT, NEW HAMPSHIRE.

TOOL-STEEL-RETAINING DEVICE.

Application filed December 31, 1919. Serial No. 348,699.

This invention relates to tool steel retaining devices especially adapted for use with hammer drills or other like tools.

The invention will be best understood by reference to the following description when taken in connection with the accompanying illustration of one specific embodiment thereof, while its scope will be more particularly pointed out in appended claims.

In the drawings:

Figure 1 shows in front elevation the forward end of a hammer drill machine equipped with a tool steel retaining device embodying one form of the invention;

Fig. 2 is a longitudinal central section of the forward end of the hammer drill machine shown in Fig. 1, the section being taken at right angles to the view shown in Fig. 1 and on the line 2—2 therein;

Fig. 3 is a transverse sectional elevation on the line 3—3 in Fig. 2;

Fig. 4 shows an end elevation of the forward end of the hammer drill shown in Fig. 1;

Fig. 5 is a detail of a slight modification and shows the housing for the tool retainer connection in sectional elevation at right angles to the section shown in Fig. 2; and Fig. 6 is a section on the line 6—6 of Fig. 5, showing the elongated slot in the end of the housing.

Referring to the drawings and the illustrative embodiment of the invention therein shown, the hammer drill machine may be of any usual or suitable construction and having a suitable control valve (not shown) for controlling the movements of the hammer piston 1. The latter is provided with the reduced hammer end 3, which is adapted to strike the end of the tool steel 5 as is usual in this class of tools. The front end of the hammer drill machine serves as a holder for the tool steel, the latter being provided with an enlarged shoulder or other portion 7 which seats against the front end of the chuck 9 by which rotary movement is imparted to the tool steel.

Rotary movement may be imparted to the chuck by any suitable means, there being provided a pressure fluid motor, of the rotary gear type, for rotating the tool steel, one gear member 11, which is shown in Fig. 2, being symmetrically arranged with relation to and rotatable about a reduced front portion 13 of the cylinder. The motor is composed of a gear member 11 cooperating with one or more rotary gear members (herein two) not shown in the drawings but arranged symmetrically at opposite sides of the cylinder end and working within a chamber which is provided within the casing 15, the latter constituting a part of the housing for the hammer drill machine.

The rotary motor acts to turn the chuck 9 through slidable reduction gearing, the rotary movement of the motor being transmitted from the aforesaid two cooperating gear members of the motor through eccentric transmission connections 16 (Fig. 3) to the internal gyratory gear member 17 of the reduction gearing. The latter is also contained within the casing 15 in a gear chamber forward of the motor chamber and separated therefrom by the partition wall 18.

The internal gear member 17 has engagement with spur gear teeth 19 formed upon an enlarged portion of the chuck 9, the latter being mounted to turn about a suitable bearing formed upon the reduced front cylinder end 13. By this means rotary movement is imparted from the motor through the intermediate reduction gear and the chuck to the tool steel.

The hammer drill machine at its forward end is provided with the front head 21, which abuts against and closes the front end of the gear chamber casing 15, and is clamped to the main or cylinder portion of the machine casing by suitable tie rods 23, the latter being provided with bearing washers 25 which bear against springs (not shown) seated within lug-like formations 26 at opposite sides of the front head to afford the required resiliency.

To retain the tool steel in the front end of the machine, a tool steel retainer is provided comprising the yoke member 27, partly embracing the tool steel, and the spaced side arms 29, the latter pivotally connected to the tool-steel holding portion of the hammer drill machine by attachment to the front head, so that the yoke and its side arms may be swung from the dotted line position shown in Fig. 1 to the full line position therein shown. In the latter position the yoke lies within the path of the enlargement 7 and prevents the detachment of the tool steel from the chuck. When the retainer is swung into or toward the dotted line position, however, it permits the withdrawal of the tool steel, the enlargement readily passing the yoke without interference. As illustrated by the drawings, the retainer may be made of a rod or the like bent or forged into the shape described.

In order to render the retainer resilient or yieldable and at the same time to provide for pivotal connection to the drill machine, the retainer is pivotally attached to resilient connections mounted within the front head. Such connections herein comprise at each side of the front head the longitudinally movable plunger member 31, the forward end of which projects through an opening in the front head and is thereat connected to one of the side arms. The rear end of each plunger is provided with an enlargement, herein in the form of a nut 33, seated against a compression spring 35, the latter contained within a recess or casing which is presented by an enlargement or formation 37 at the side of the front head. The two such enlargements or housings 37 for the retainer springs are formed at opposite sides of and within the front head and at right angles to the enlargements 26 for the tie rod springs. Both enlargements 26 and 37 lie within the marginal limits of the gear casing 15, the front head covering the front end of the gear chamber and gear casing and the recess for the retainer springs opening into the gear chamber. This provides a relatively small front head in which the various parts are located in a close compact relation While any suitable connections may be had between the retainer and the resiliently mounted plungers 31, herein the forwardly projecting ends of the plungers are formed into eyes 39 which are axially aligned with each other, the ends of the side arms being bent to pass through the eyes so that they are fulcrumed therein. Herein one of the side arms is bent around the eye so as to be coupled thereto, while the opposite arm passes through the eye and is prolonged up at the side of the hammer tool, presenting a member 41 which may be utilized both as a handle or lever to force the retainer into or out of retaining position and at the same time may be employed to lock the retainer. It will be observed that my construction provides that the springs 35 hold the side arms firmly against the abutment afforded by the forward faces of the enlargements 37. This prevents the yoke from vibrating relatively to the eyes, which vibration, if permitted, would, by the hammering action, rapidly wear the contacting surfaces of the eyes and side arms and result in breakage. To provide a seat for the side arms and further eliminate wear and vibration, the forward faces of the enlargements are provided with the grooves or other suitable formations 42 for receiving or supporting the side arms.

The front head is provided with lugs 43 between which there is presented a groove or seat which receives the prolongation 41 when the retainer is swung into tool-retaining position. When it is desired to release the tool, the handle is forced out of the groove or seat and snapped over one of the lugs as indicated by dotted lines in Fig. 1. When the retainer is to be moved back into tool-retaining position, it is swung back into the full-line position shown in Fig. 1 and snapped or forced into the seat, the lugs effectively holding it.

The connection of the retainer to the eyes 39 provides a fulcruming point which is forward of the chuck at or in the vicinity of the enlargement 7 permitting the use of relatively short side arms for the retainer and giving an effective leverage to the prolongation 41, either for the purpose of locking the retainer or for the purpose of swinging it into or out of position If desired, the shouldered head 33 of the plunger member 31 may be riveted or otherwise permanently secured to the plunger and may be octagonal, round or of any other suitable shape. To facilitate the assemblage of the retainer parts, the enlargements 37 and the recesses or spaces which receive the springs therein are made of sufficient size to allow the eyes 39 to pass down into their respective recesses, and the opening 47 in the front of the enlargement through which the plunger member 31 passes is in the form of an elongated slot of sufficient size to take the eye 39. When the parts are to be assembled, the plungers with the coil springs 35 in position are inserted into the recesses of the front head from the back thereof and pressure applied to the enlarged heads of the plungers to compress the springs and force the eyes 39 through the slots 47 until they are projected a sufficient distance to slip the two retainer yoke arms into the open throat of the two eyes 39. When thus positioned, the pressure is removed and the springs draw the retainer yoke into the position shown in the drawings.

While I have herein described for purposes of illustration one specific embodiment of the invention, it is to be understood that the same is not limited to the mechanical details herein shown, nor to the form or relative arrangement of parts, but that extensive deviations may be made therefrom without departing from the spirit thereof.

I claim:

1. In an apparatus of the class described, a tool steel retainer comprising a yoke with separated side arms, resilient connections for said side arms comprising plungers having enlarged front ends to connect with the side arms, springs engaging said plungers, housings for said springs and plungers secured to the tool casing and having openings in the forward ends of sufficient size to receive said enlarged ends, said springs acting to draw said side arms rearwardly and to hold them resiliently against the forward ends of said housings under sufficient force to prevent substantial vibration of said retainer.

2. In a drilling machine, a chuck formed for carrying a drill steel, a retainer for said steel having side arms and a steel engaging portion, a casing housing said chuck formed with forwardly facing abutments, said retainer having transverse portions integral with said side arms, resilient means pivotally engaging said transverse portions of said retainer and drawing them yieldingly against said abutments with sufficient force to prevent substantial vibration of said retainer, a handle for swinging said retainer into and out of operative position, said handle formed integrally with said retainer and having a portion adapted to lie at the side of said casing substantially parallel to said drill steel, and locking means carried by said casing for engaging said handle and permitting it to yield in the direction of the length of said drill steel when said retainer is in operative position.

3. In a drilling machine, a tool retainer having side arms, a support for said arms, means including springs under initial tension for drawing said arms yieldingly against said support with sufficient force to prevent substantial vibration of said retainer, said means providing a pivotal support for said retainer, a handle for swinging said retainer into and out of operative position, said handle having a portion lying substantially parallel to said drill steel when said retainer is in operative position, and locking means engaging said handle and permitting it to yield in the direction of the length of said drill steel.

4. In a drilling machine, a casing, a pair of members housed by said casing, springs for drawing said members rearwardly, a retainer situated exteriorly of said casing, said retainer having a pair of arms carrying drill steel engaging means, abutments formed by said casing, spring means carried by said members for engaging said arms and acting resiliently to hold said arms pivotally against said abutments with sufficient force to prevent substantial vibration of said retainer.

5. In a drilling machine, a casing, a pair of eye bolts, a retainer having drill steel engaging means and portions at opposite sides thereof pivotally engaged by the eyes of said bolts, springs acting to force said bolts rearwardly, said casing having portions formed with perforations for receiving the shanks of said bolts, said portions of said casing presenting oppositely facing surfaces respectively serving as abutments for said springs and the portions of said retainer engaged by the eyes of said bolts, said springs acting to hold said portions of said retainer against the abutments with sufficient force to prevent substantial vibration of said retainer.

6. In a drilling machine, a chuck, a front head structure, a drill steel carried by said chuck, a drill steel retainer carried by said front head structure, said drill steel retainer having side arms and a yoke, supporting means for said retainer, said supporting means comprising a plunger and spring, said plunger having a head formed with a perforation and a lateral opening intersecting said perforation whereby said head may be hooked over said retainer, a housing for said plunger and spring having a front wall, and said front wall being perforated to permit said head of said plunger to be passed through said front wall whereby to compress said spring and hook said head over said retainer.

7. In a drilling machine, a chuck formed for carrying a drill steel, a front head structure, a drill steel retainer carried by said front head structure, said drill steel retainer having side arms and a yoke, supporting means for said retainer, said supporting means comprising a plunger and spring, said plunger having a head formed to hook over said retainer, a housing for said plunger and spring having a front wall, said retainer lying against the forward side of said front wall, said front wall being perforated to permit said head to be passed therethrough for hooking over said retainer, and said plunger being of such length that when said head engages said retainer said spring will be compressed.

8. In a drilling machine, a front head structure, a chuck in said front head structure formed for carrying a drill steel, a drill steel retainer having side arms and a yoke for engaging said drill steel, said retainer further having transverse portions and a rearwardly extending handle lever integrally formed with one of said transverse portions, said front head structure carrying portions providing forwardly facing surfaces behind said transverse portions and against which said transverse portions rest, plunger members having heads engaging said transverse portions, and springs under initial tension located behind said forwardly facing surfaces for drawing said plungers rearwardly.

In testimony whereof, I have signed my name to this specification.

GEORGE H. GILMAN.